United States Patent
Ino

(10) Patent No.: US 11,934,733 B2
(45) Date of Patent: Mar. 19, 2024

(54) VEHICLE CONTROL DEVICE, VEHICLE DISPLAY SYSTEM, AND VEHICLE DISPLAY CONTROL METHOD

(71) Applicant: DENSO CORPORATION, Kariya (JP)

(72) Inventor: Yuko Ino, Kariya (JP)

(73) Assignee: DENSO CORPORATION, Kariya (JP)

( * ) Notice: Subject to any disclaimer, the term of this patent is extended or adjusted under 35 U.S.C. 154(b) by 180 days.

(21) Appl. No.: 17/545,841

(22) Filed: Dec. 8, 2021

(65) Prior Publication Data

US 2022/0100451 A1 Mar. 31, 2022

Related U.S. Application Data

(63) Continuation of application No. PCT/JP2020/018896, filed on May 12, 2020.

(30) Foreign Application Priority Data

Jun. 11, 2019 (JP) .................. 2019-108848

(51) Int. Cl.
G06F 3/14 (2006.01)
B60K 35/00 (2006.01)
G06F 9/455 (2018.01)

(52) U.S. Cl.
CPC ............ *G06F 3/14* (2013.01); *B60K 35/00* (2013.01); *G06F 9/45558* (2013.01); *B60K 2370/152* (2019.05); *G06F 2009/4557* (2013.01)

(58) Field of Classification Search
CPC ...... G06F 9/44; G06F 9/45558; G06F 9/4557; G06F 3/14; B60K 35/00
See application file for complete search history.

(56) References Cited

U.S. PATENT DOCUMENTS

| | | | |
|---|---|---|---|
| 2008/0211654 A1 | 9/2008 | Kasamatsu | |
| 2016/0103687 A1 | 4/2016 | Matsuyama et al. | |
| 2016/0286125 A1 | 9/2016 | Takagi | |
| 2018/0354581 A1* | 12/2018 | Meermann | ............. B62J 45/414 |
| 2020/0148144 A1 | 5/2020 | Shiomi | |

FOREIGN PATENT DOCUMENTS

| | | |
|---|---|---|
| JP | 2005064709 A | 3/2005 |
| JP | 2008213609 A | 9/2008 |
| JP | 2010-277177 A | 12/2010 |
| JP | 2014-192656 A | 10/2014 |
| JP | 2014222461 A | 11/2014 |
| JP | 2016187129 A | 10/2016 |
| JP | 2017-190995 A | 10/2017 |
| WO | WO-2019017381 A1 | 1/2019 |

\* cited by examiner

*Primary Examiner* — Sardis F Azongha

(74) *Attorney, Agent, or Firm* — Harness, Dickey & Pierce, P.L.C.

(57) ABSTRACT

A vehicle control device controls a display provided in a cabin of a vehicle. The device includes a physical processor that runs a plurality of operating systems in parallel; and an output unit that is configured to display a display element on the display by outputting the display element generated by each of the plurality of operating systems to the display. The plurality of operating systems include: a first operating system that is configured to generate a precedent display element; and one or more second operating systems other than the first operating system. The first operating system is activated prior to activating the one or more second operating systems when activating the vehicle control device.

18 Claims, 10 Drawing Sheets

VEHICLE CONTROL DEVICE, VEHICLE DISPLAY SYSTEM, AND VEHICLE DISPLAY CONTROL METHOD

CROSS REFERENCE TO RELATED APPLICATIONS

This application is a continuation application of International Patent Application No. PCT/JP2020/018896 filed on May 12, 2020, which designated the U.S. and claims the benefit of priority from Japanese Patent Application No. 2019-108848 filed on Jun. 11, 2019. The entire disclosure of all of the above application is incorporated herein by reference.

TECHNICAL FIELD

The present disclosure relates to a vehicle control device, a vehicle display system, and a vehicle display control method.

BACKGROUND ART

There has been known a technology capable of running a plurality of operating systems (OS: Operating System) in parallel. For example, such a technology makes it possible to run two OSs in parallel on a plurality of virtual processors logically achieved by real processors. Such a technology is referred to as a virtualization technology.

SUMMARY

One aspect of the present disclosure is a vehicle control device that controls a display provided in a cabin of a vehicle. The device includes: a physical processor that is configured to run a plurality of operating systems in parallel, each of the plurality of operating systems generating a display element to be displayed on the display; and an output unit that is configured to display the display element on the display by outputting the display element generated by each of the plurality of operating systems to the display. The plurality of operating systems include: a first operating system that is configured to generate a precedent display element and to execute an application associated with an security/safety function; and one or more second operating systems that are the plurality of operating systems other than the first operating system and are configured to execute an application associated with an infotainment function that is a function associated with convenience and/or comfort other than security and safety. The precedent display element is the display element to be displayed foremost when activating the vehicle control device. The first operating system is configured to be activated prior to activating the one or more second operating systems when activating the vehicle control device.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
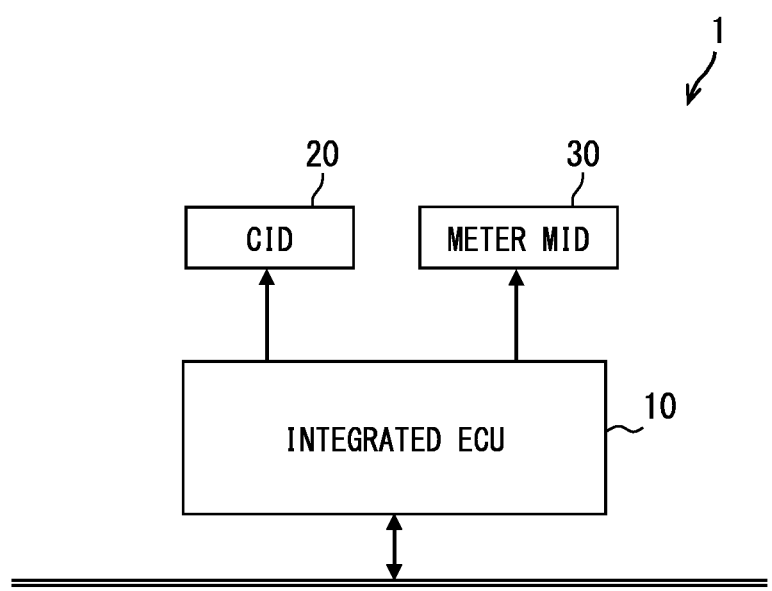
FIG. 1 shows an example of a schematic configuration of a vehicle display system.

To begin with, a relevant technology will be described only for understanding the following embodiments.

In a case of using the technology of enabling a plurality of OSs to operate in parallel in a vehicle control device that makes a display in a vehicle cabin perform display, the following problems are conceived.

For example, in a case of starting activation of the vehicle control device along with the start of using a vehicle, the plurality of OSs also transit to a state in which respective display functions can be performed after respective activation processes. Here, it is conceived that timings of completing activation of the plurality of OSs are not identical and some OSs may delay activation completion. In a case in which the display function of the display content that must be promptly displayed at the time of activating the vehicle control device is arranged in the OS that delays activation completion, display of the display content delays with respect to display of other display contents.

Particularly, in a case of performing activation processes of the plurality of OSs on a common hardware based on the virtualization technology, it takes longer time until activation completion of the OSs as much as the plurality of OSs use the common hardware. Hence, delay of displaying the display content described above may become more prominent.

One objective of this disclosure is to provide a vehicle control device, a vehicle display system, and a vehicle display control method that make it possible to display a display content that must be promptly displayed at the time of activating the vehicle control device more promptly than other display contents even when using the technology of enabling a plurality of operating systems to run in parallel in the vehicle control device that makes a display in a vehicle cabin perform display.

As described above, according to the one aspect of the present disclosure, a vehicle control device controls a display provided in a cabin of a vehicle. The device includes: a physical processor that is configured to run a plurality of operating systems in parallel, each of the plurality of operating systems generating a display element to be displayed on the display; and an output unit that is configured to display the display element on the display by outputting the display element generated by each of the plurality of operating systems to the display. The plurality of operating systems include: a first operating system that is configured to generate a precedent display element and to execute an application associated with an security/safety function; and one or more second operating systems that are the plurality of operating systems other than the first operating system and are configured to execute an application associated with an infotainment function that is a function associated with convenience and/or comfort other than security and safety. The precedent display element is the display element to be displayed foremost when activating the vehicle control device. The first operating system is configured to be activated prior to activating the one or more second operating systems when activating the vehicle control device.

According to another aspect of the present disclosure, a vehicle control device controls a display provided in a cabin of a vehicle. The device includes: a physical processor that is configured to run a plurality of operating systems in parallel, each of the plurality of operating systems generating a display element to be displayed on the display; and an output unit that is configured to display the display element on the display by outputting the display element generated by each of the plurality of operating systems to the display. The plurality of operating systems include: a first operating system that is configured to generate a precedent display element; and one or more second operating systems that are the plurality of operating systems other than the first operating system. The precedent display element is the display element to be displayed foremost when activating the vehicle control device. The first operating system is configured to be activated prior to activating the one or more second operating systems when activating the vehicle control device. The one or more second operating systems are configured to generate a next content image that is a display content formed of the display element generated by the one or more second operating systems. The first operating system is configured to generate a partial image element that is a part of the next content image. The output unit is configured to display the partial image element before display of the next content image starts after display of the precedent display element ended.

According to yet another aspect of the present disclosure, a vehicle control device controls a display provided in a cabin of a vehicle. The device includes: a physical processor that is configured to run a plurality of operating systems in parallel, each of the plurality of operating systems generating a display element to be displayed on the display; and an output unit that is configured to display the display element on the display by outputting the display element generated by each of the plurality of operating systems to the display. The plurality of operating systems include: a first operating system that is configured to generate a precedent display element; and one or more second operating systems that are the plurality of operating systems other than the first operating system. The precedent display element is the display element to be displayed foremost when activating the vehicle control device. The first operating system is configured to be activated prior to activating the one or more second operating systems when activating the vehicle control device. The one or more second operating systems are configured to generate a next content image that is a content image containing a second side element generated by the one or more second operating systems as the display element. The first operating system is configured to generate a partial display element that is a part of the next content image excluding the second side element. The output unit is configured to keep displaying the partial display element until display of the next content image starts after display of the precedent display element ended.

According to yet another aspect of the present disclosure, a vehicle display control method is for a vehicle control device to control a display provided in a cabin of a vehicle. The method comprising: when activating the vehicle control device, activating a first operating system first among a plurality of operating systems, and then activating one or more second operating systems that are the plurality of operating systems other than the first operating system. The plurality of operating systems are configured to generate a display element to be displayed on the display and are controlled to operate in parallel by a physical processor. The first operating system is configured to generate a precedent display element that is the display element to be displayed foremost and to execute an application associated with an security/safety function. The one or more second operating systems are configured to execute an application associated with an infotainment function that is a function associated with convenience and/or comfort other than security and safety.

According to yet another aspect of the present disclosure, a vehicle display control method is for a vehicle control device to control a display provided in a cabin of a vehicle. The method includes: when activating the vehicle control device, activating a first operating system first among a plurality of operating systems, and then activating one or more second operating systems that are the plurality of operating systems other than the first operating system/. The plurality of operating systems are configured to generate a display element to be displayed on the display and are controlled to operate in parallel by a physical processor. The first operating system is configured to generate a precedent display element that is the display element to be displayed foremost. The one or more second operating systems are configured to generate a next content image that is a display content formed of the display element generated by the one or more second operating systems. The first operating system is configured to generate a partial image element that is a part of the next content image. The method further comprises displaying the partial image element before starting display of the next content image after ending display of the precedent display element.

According to yet another aspect of the present disclosure, a vehicle display control method is for a vehicle control device to control a display provided in a cabin of a vehicle. The method includes: when activating the vehicle control device, activating a first operating system first among a plurality of operating systems, and then activating one or more second operating systems that are the plurality of operating systems other than the first operating system. The plurality of operating systems are configured to generate a display element to be displayed on the display and are controlled to operate in parallel by a physical processor. The first operating system is configured to generate a precedent display element that is the display element to be displayed foremost. The one or more second operating systems are configured to generate a next content image that is a content image containing a second side element generated by the one or more second operating systems as the display element. The first operating system is configured to generate a partial display element that is a part of the next content image excluding the second side element. The method further comprises keeping displaying the partial display element until display of the next content image starts after ending display of the precedent display element.

According to the above description, among a plurality of operating systems capable of being run in parallel by a physical processor at the time of activating the vehicle control device, a first operating system that generates a precedent display element that is a display element to be displayed ahead of the activation is activated earlier than a second operating system that is another operating system. Accordingly, it is possible to generate the display element generated by the first operating system earlier than the display element generated by the second operating system at the time of activating the vehicle control device. Thus, it is possible to display the display element generated by the first operating system by an output unit earlier than the display element generated by the second operating system. As a result, even when using the technology of enabling a plurality of operating systems to run in parallel in the vehicle control device that makes a display in a vehicle cabin perform display, it is possible to display the display content to be displayed promptly at the time of activating the vehicle control device more promptly than other display contents.

Moreover, according to yet another aspect of the present disclosure, a vehicle display system includes: a display provided in a cabin of a vehicle; and the vehicle control device that is configured to control the display.

According to the above description, because the aforementioned vehicle control device is included, even when using the technology of enabling a plurality of operating systems to run in parallel in the vehicle control device that makes a display in a vehicle cabin perform display, it is possible to display the display content to be displayed promptly at the time of activating the vehicle control device more promptly than other display contents.

A plurality of embodiments for disclosure are described with reference to drawings. For convenience of description, through a plurality of embodiments, parts having the same function as that of a part shown in a figure referenced in preceding description are denoted with the same symbol, and description thereof may be omitted. For the parts denoted with the same symbol, description of other embodiments can be referenced.

First Embodiment

Schematic Configuration of Vehicle Display System 1

In the following, the present embodiment will be described with reference to drawings. First, description is given about a vehicle display system 1. The vehicle display system 1 is used in a vehicle. In the following, description is given assuming that the vehicle display system 1 is used in an automobile. As shown in FIG. 1, the vehicle display system 1 includes an integrated ECU 10, a center information display (hereinbelow, CID) 20, and a meter multi-information display (hereinbelow, meter MID) 30.

The CID 20 is a display provided in a center cluster inside a vehicle cabin. A display that allows for drawing an image may be used as the CID 2. A liquid crystal display, an organic EL display, and the like may be used as the CID 20. The CID 20 mainly displays information about a function that requires convenience and comfort rather than security and safety. By way of example, the CID 20 mainly displays information about an infotainment function such as navigation information, audio information, air conditioning information, and the like. The infotainment function as used herein is a function associated with convenience and comfort other than security and safety.

The navigation information is information about a navigation function such as, for example, a route guidance image. The audio information is an image or the like related to an operation of an audio equipment. The air conditioning information is an image or the like related to an operation of an air conditioner. The CID 20 also displays information about a startup screen besides the information about the infotainment function. The information about the startup screen is, for example, an image related to a welcome performance at the time of opening a vehicle door (hereinbelow, welcome image), an image related to an opening performance at the time of vehicle activation (hereinbelow, opening image), or the like. The welcome image is an image displayed at the time of opening the vehicle door, which is displayed earlier than the vehicle activation. The opening image is an image displayed at the time of vehicle activation. The welcome image and the opening image may be configured to be displayed, for example, as an animation by displaying a plurality of frames of still images in the order of time sequence.

The meter MID 30 is a display provided in front of a driver's seat inside the vehicle cabin. By way of example, the meter MID 30 may be configured to be provided on a meter panel. As the meter MID 30, a display may be used that allows for drawing an image. As the meter MID 30, a liquid crystal display, an organic EL display, and the like may be used. The meter MID 30 mainly displays information about a function that requires security and safety rather than convenience and comfort. By way of example, the meter MID 30 mainly displays information about a security and safety function such as meter information.

The meter information is information about a meter indication. The meter MID 30 displays information about the startup screen, simplified navigation information, and the like besides the information about the security and safety function. The information about the startup screen is the aforementioned welcome image, opening image, or the like, and may or may not be identical to the welcome image and the opening image displayed on the CID 20. The simplified navigation information is information about the infotainment function, which is simplified as compared to the navigation information displayed on the CID 20. For example, the simplified navigation information is a simplified route guidance image such as an indication indicative of the next travelling direction or the like.

The integrated ECU 10 is an ECU (Electronic Control Unit) that integrates a function of controlling the CID 20 and a function of controlling the meter MID 30. The integrated ECU 10 is connected to the CID 20 and the meter MID 30, and makes the CID 20 and the meter MID 30 draw and display various images. The integrated ECU 10 is also connected to an in-vehicle LAN, and receives inputs from a sensor connected to the in-vehicle LAN, another ECU, and the like. An image drawn on the CID 20 and the meter MID 30 by the integrated ECU 10 corresponds to output information of the integrated ECU 10. Information input to the integrated ECU 10 via the in-vehicle LAN corresponds to input information of the integrated ECU 10. The input information includes vehicle information such as a vehicle speed and a travel distance, video information for a digital television, smartphone cooperation information for cooperate with a smartphone, and the like. The integrated ECU 10 is configured to collectively manage the input information and the output information and is free to recombine an input source and an output destination of various information.

The integrated ECU 10 is constituted mainly by a microcontroller (hereinbelow, microcontroller) including, for example, a processor, a memory, an I/O, and a but connecting them. The processor as used herein is a physical processor (hereinbelow, physical processor) constituted by an arithmetic unit, a register, and the like. The physical processor may be constituted by a single physical processor core or a plurality of physical processor cores.

The integrated ECU 10 performs various processes related to displaying an image on the CID 20 and the meter MID 30 by executing a control program stored in a nonvolatile memory. Particularly, in the present embodiment, the integrated ECU 10 enables a plurality of OSs to be run on a virtualization software and enables each of the plurality of OSs to perform a process related to displaying an image thereon. The integrated ECU 10 is equivalent to a vehicle control device. Moreover, performing the process by the integrated ECU 10 is equivalent to performing a vehicle display control method. The memory used herein is a non-transitory tangible storage medium (non-transitory tangible storage medium) that stores therein a computer-readable program and data in a non-transitory manner. Moreover, the non-transitory tangible storage medium is achieved by a semiconductor memory or a magnetic disk. The integrated ECU 10 will be detailed in the following.

Schematic Configuration of Integrated ECU 10

Figure 2:
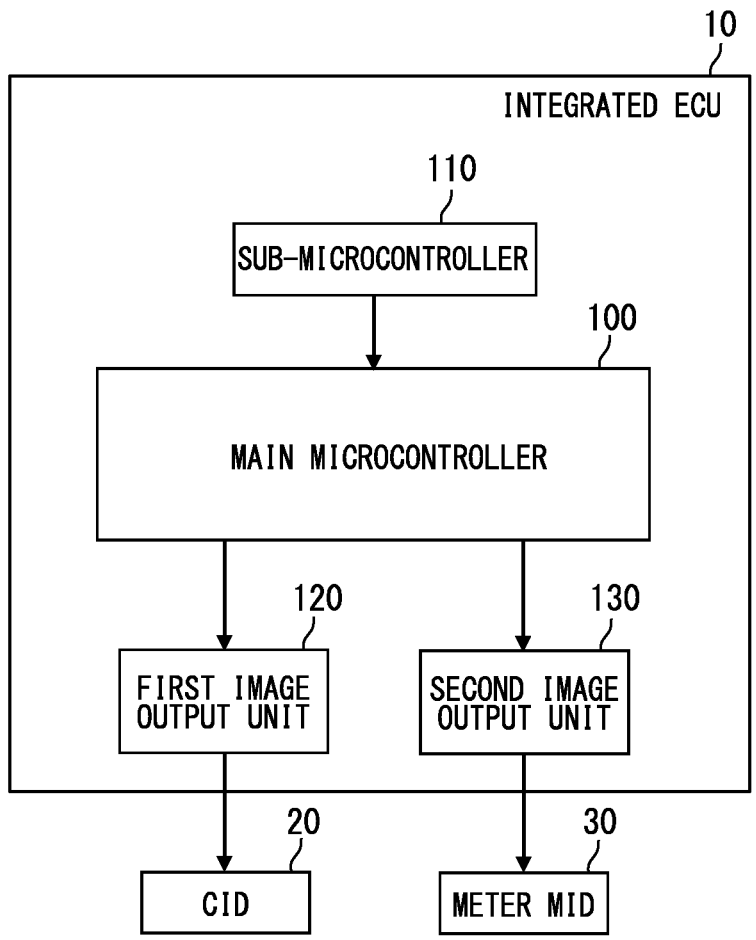
FIG. 2 shows an example of a schematic configuration of an integrated ECU.
Figure 3:
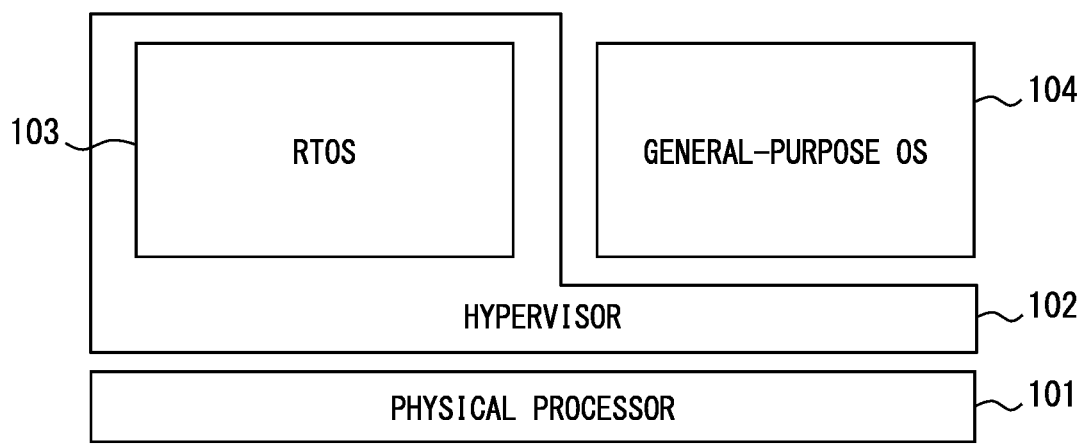
FIG. 3 shows an example of a conceptual configuration of a physical processor in a main microcontroller according to a first embodiment.

Subsequently, an example of a schematic configuration of the integrated ECU 10 is described with reference to FIG. 2. FIG. 2 shows an example of a configuration related to displaying an image on the CID 20 and the meter MID 30 for convenience. The integrated ECU 10 includes a main microcontroller 100, a sub-microcontroller 110, a first image output unit 120, and a second image output unit 130. A part or all of the function to be performed by the integrated ECU 10 may be configured by one or more ICs as a hardware.

The sub-microcontroller 110 includes a function of controlling on/off of the main microcontroller 100 and the like. The sub-microcontroller 110 activates the main microcontroller 100 in a case of detecting an activation trigger of the integrated ECU 10. Examples of the activation trigger include rise of source voltage to a certain level, acquisition of a wake-up signal from the in-vehicle LAN, and the like. The activation trigger occurs at a user-vehicle start time. The user-vehicle start time includes a vehicle activation time when a switch for starting an internal combustion engine or a motor generator in the vehicle (hereinbelow, power switch) is turned on, a vehicle door opening time when a vehicle door is opened, and the like.

The sub-microcontroller 110 may be configured to make the main microcontroller 100 take different aspects of activation between the vehicle activation time and the vehicle door opening time, for example, by detecting the activation trigger distinguishing between the vehicle activation time and the vehicle door opening time and transmitting an instruction in accordance with respective activation triggers.

In the present embodiment, the activation of the integrated ECU 10 is described assuming that the activation occurs at the time of activating the vehicle and the vehicle door opening time, respectively. The example in which the activation of the integrated ECU 10 occurs at both of the vehicle activation time and the vehicle door opening time includes a case in which the activation of the integrated ECU 10 is terminated after a certain time has passed since opening of the vehicle door without the vehicle being activated. The activation of the integrated ECU 10 may be replaced by, for example, activation of the main microcontroller 100.

The main microcontroller 100 generates an image to be displayed on the CID 20 and an image to be displayed on the meter MID 30. The main microcontroller 100 displays the images of the display contents to be displayed respectively on the CID 20 and the meter MID 30 at the time of activating the integrated ECU 10 after having displayed an image to be displayed ahead of the activation time of the integrated ECU 10 (hereinbelow, precedent display image). The main microcontroller 100 may be configured to display the welcome image as the precedent display image at the time of opening the vehicle door. The main microcontroller 100 may be configured to display the opening image as the precedent display image at the time of activating the vehicle. An application that allows for displaying the precedent display image is hereinafter referred to as a precedent display application.

Moreover, the main microcontroller 100 displays a content image to be displayed preferentially at the time of activating the integrated ECU 10 separately from the precedent display image (hereinbelow, priority image). Priority as used herein means, for example, to display the priority image earlier than displaying information about the infotainment function. An example of the priority image includes indication of information about security and safety function to be displayed ahead of other indications such as the meter indication. The application that displays the priority image is hereinafter referred to as a priority application. While the example of the priority image may include a captured image taken by a rearview camera, description is given taking an example of the meter indication in the following. A configuration of the main microcontroller 100 to display an image on the CID 20 and the meter MID 30 will be detailed later.

The first image output unit 120 outputs an image generated by the main microcontroller 100 to the CID 20 and draws the image on the CID 20. As the first image output unit 120, for example, an IC may be used. The second image output unit 130 outputs an image generated by the main microcontroller 100 to the meter MID 30 and draws the image on the meter MID 30. As the second image output unit 130, for example, an IC may be used.

Moreover, the integrated ECU 10 abstracts a hardware resource of the main microcontroller 100 by the virtualization technology and makes it possible to run a plurality of operating systems (hereinbelow, OSs) in parallel on a single main microcontroller 100. The integrated ECU 10 abstracts the physical processor in the main microcontroller 100 and makes it possible to run the plurality of OSs in parallel on the virtualization software by executing the control program of the virtualization software stored in the nonvolatile memory.

More specifically, the integrated ECU 10 runs respective OSs by abstracting the physical processor into a plurality of virtual processor cores by the virtualization technology and assigning different virtual processor cores (hereinbelow, virtual cores) to the respective OSs. The virtualization software may run the OSs on the different virtual cores, respectively, by operating as if there are virtually a plurality of cores (i.e., virtual cores) by time-dividing the resource of the physical processor in units of clocks. The physical processor is supposed to consist of a plurality of physical processor cores (hereinbelow, physical cores). A linkage between the virtual core and a logical core is not necessarily in one-to-one ratio but a plurality of virtual cores may be configured to be linked to a single logical core.

The virtualization software is supposed to be a software specialized for virtualization that achieves virtualization by managing an operating condition of the virtual processor core. By way of example, description is given below taking an example of using a hypervisor (Hypervisor) as the virtualization software. In the following, description is given assuming that two OSs are enabled to run in parallel on the hypervisor by the virtualization technology.

Conceptual Configuration of Physical Processor 101 in Main Microcontroller 100

Now, an example of a conceptual configuration of a physical processor 101 in the main microcontroller 100 according to a first embodiment is described. Here, description is given taking an example of a real-time operating system (hereinbelow, RTOS) 103 having real time characteristics and a general-purpose operating system (hereinbelow, general-purpose OS) 104 as the two OSs. The RTOS 103 may be, for example, QNX (registered trademark). The general-purpose OS 104 may be, for example Linux (registered trademark).

The main microcontroller 100 includes a hypervisor 102 on the physical processor 101. Moreover, the hypervisor 102 is capable of running the RTOS 103 and the general-purpose OS 104 in parallel on the virtual processor core extracted from the physical processor 101. The hypervisor 102 and the RTOS 103 are supposed to share a common microkernel (hereinbelow, kernel). The RTOS 103 is equivalent to a first operating system and the general-purpose OS 104 is equivalent to a second operating system.

Since the RTOS 103 has the real time characteristics, the RTOS 103 runs an application related to the aforementioned security and safety function. On the other hand, the general-purpose OS 104 runs an application related to the aforementioned infotainment function. In other words, the general-purpose OS 104 runs an application related to a service that the user receives in the vehicle. The RTOS 103 generates an image related to the security and safety function and the general-purpose OS 104 generates an image related to the infotainment function. However, in the present embodiment, the RTOS 103 is supposed to exceptionally generate the precedent display image besides the image related to the security and safety function. The precedent display image may be the aforementioned opening image, the welcome image, or the like. A display element constituting the precedent display image is equivalent to a precedent display element. In the following, description is given assuming that the precedent display element is the opening image.

Operation of The Integrated ECU 10 At Activation Time

Subsequently, description is given about an operation of the integrated ECU 10 at the activation time with reference to a time chart shown in FIG. 4. Hereinafter, description is given taking an example of displaying the opening image on the CID 20 at the time of activating the vehicle. The same applies to a case of displaying the welcome image on the CID 20 at the time of opening the door.

At the time of activating the integrated ECU 10, the main microcontroller 100 is activated by the sub-microcontroller 110 that detected the activation trigger. Then, the hypervisor 102 starts to be configured in the main microcontroller 100. Here, because the RTOS 103 shares the kernel with the hypervisor 102, activation preparation of the RTOS 103 is initiated along with configuration of the hypervisor. Start of the activation preparation of the RTOS 103 corresponds to the activation start of the RTOS 103. Subsequently, when the configuration of the hypervisor 102 proceeds to a stage where the activation preparation of the general-purpose OS 104 can start, the activation preparation of the general-purpose OS 104 is initiated. The start of the activation preparation of the general-purpose OS 104 corresponds to the activation start of the general-purpose OS 104. Since the activation preparation of the general-purpose OS 104 cannot start unless the configuration of the hypervisor 102 proceeds, the activation preparation of the general-purpose OS 104 is initiated later than the activation preparation of the RTOS 103.

When the configuration of the hypervisor 102 proceeds and the activation preparation of the RTOS 103 reaches a stage where the precedent display application is executable, the RTOS 103 runs the precedent display application on the hypervisor 102. By way of example, the RTOS 103 makes it possible to run a plurality of applications including the precedent display application at the time of activation completion and makes it possible to run the precedent display application before the activation completion.

In a case in which the RTOS 103 runs the precedent display application, the RTOS 103 generates the opening image as the precedent display image. The RTOS 103 writes the generated opening image into the shared memory of the main microcontroller 100. The RTOS 103 develops the opening image written into the shared memory of the main microcontroller 100 in a graphic memory. In a case in which there is a multilayer image, the RTOS 103 may synthesize the multilayer image and develop the image in the graphic memory. For example, the image generated by the RTOS 103 and the image generated by the general-purpose OS 104 may have different layers.

The first image output unit 120 reads the opening image developed in the graphic memory. The first image output unit 120 outputs the read opening image to the CID 20 and draws the opening image on the CID 20. The first image output unit 120 is equivalent to an output unit. In a case of displaying the opening image by animation, the above-mentioned process is sequentially performed on each frame of the still images constituting the animation.

Since the activation preparation of the general-purpose OS 104 starts later than the activation preparation of the RTOS 103, it is possible to run the application on the general-purpose OS 104 later than the RTOS 103 generating the opening image. The general-purpose OS 104 runs an application that displays information about the infotainment function, and generates a content image to be displayed after the opening image (hereinbelow, next content image). The general-purpose OS 104 writes the generated next content image into the shared memory. Subsequently, the RTOS 103 develops the next content image written into the shared memory of the main microcontroller 100 in the graphic memory.

The first image output unit 120 reads the next content image developed in the graphic memory. The first image output unit 120 outputs the read next content image to the CID 20 and draws the next content image on the CID 20. According to the present embodiment, because the next content image generated by the general-purpose OS 104 is also drawn by the RTOS 103, the RTOS 103 displays both the image generated by the RTOS 103 and the image generated by the general-purpose OS 104. The embodiment is not limited thereto but may be configured so that, for example, the next content image generated by the general-purpose OS 104 is drawn by the general-purpose OS 104.

Figure 4:
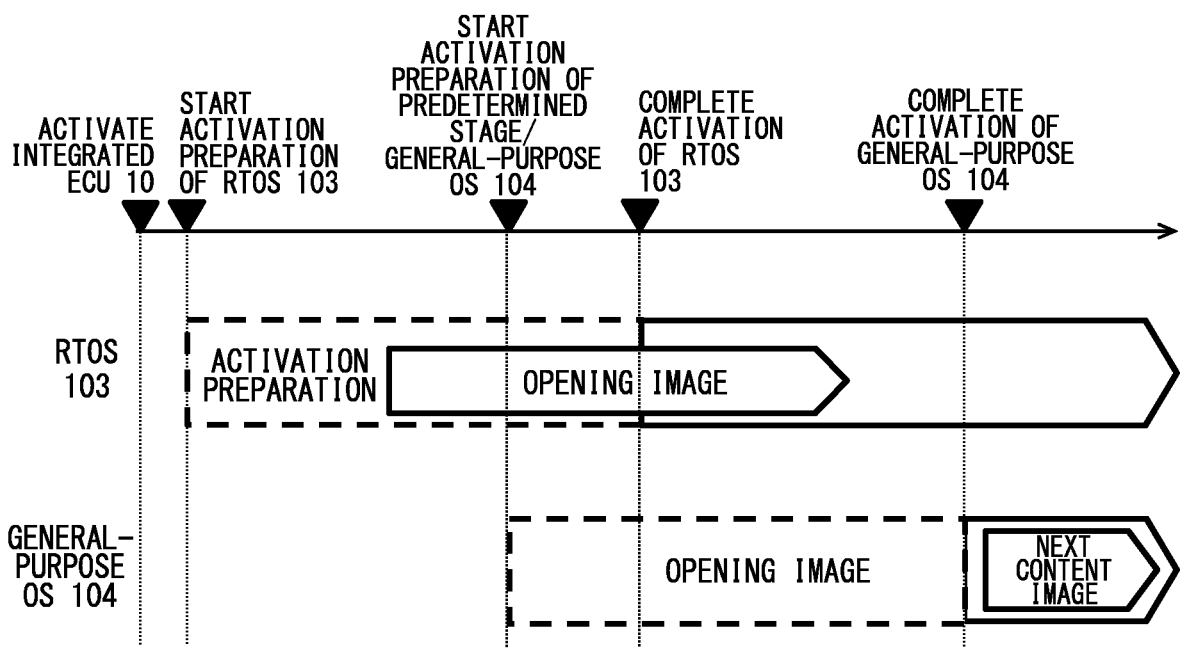
FIG. 4 is a time chart for illustrating an operation of the main microcontroller at the time of activating the integrated ECU.

As shown in FIG. 4, it is preferable that the hypervisor 102 does not start the activation preparation of the general-purpose OS 104 to be run later until the activation preparation of the RTOS 103 to be run earlier reaches a predetermined stage. According to the above description, until the activation preparation of the general-purpose OS 104 is initiated, it is possible to concentrate the hardware resource to the activation preparation of the RTOS 103 and to run more promptly the RTOS 103 to be run earlier. The predetermined stage as used herein may be, for example, a stage where it is possible to run a priority application that displays the priority image of the meter indication or the like. This makes it possible to perform more promptly a process such as meter indication that needs to be promptly coped with at the time of activating the integrated ECU 10. Hereinbelow, that running of the priority application is made possible is referred as activation completion of the priority application. Moreover, the predetermined stage may be a stage where the activation of the RTOS 103 is completed or a stage where the opening image starts to be displayed.

Summary of the First Embodiment

According to the configuration of the first embodiment, the integrated ECU 10 starts activation of the general-purpose OS 104 earlier than the RTOS 103 at the time of activating the integrated ECU 10 by the RTOS 103 that generates the precedent display image using the kernel common to the hypervisor 102. This allows the integrated ECU 10 to generate the image to be generated by the RTOS 103 at the time of activating the integrated ECU 10 earlier than the image to be generated by the general-purpose OS 104. Moreover, the first image output unit 120 is made to display the image generated by the RTOS 103 on the CID 20 earlier than the image generated by the general-purpose OS 104. Therefore, the integrated ECU 10 can display the precedent display image generated by the RTOS 103 at the time of activating the integrated ECU 10 more promptly than the next content image generated by the general-purpose OS 104. As a result, it is made possible to display the display content to be displayed promptly at the time of activating the vehicle control device more promptly than other display contents even when using the technology of enabling a plurality of OSs to operate in parallel in the vehicle control device that makes a display in a vehicle cabin perform display.

Second Embodiment

The first embodiment presented the configuration that makes it possible to activate the RTOS 103 that generates the precedent display image at the time of activating the integrated ECU 10 more promptly than the general-purpose OS 104. However, the following problem is caused by starting activation of the RTOS 103 that generates the precedent display image more promptly than the general-purpose OS 104.

Figure 5:
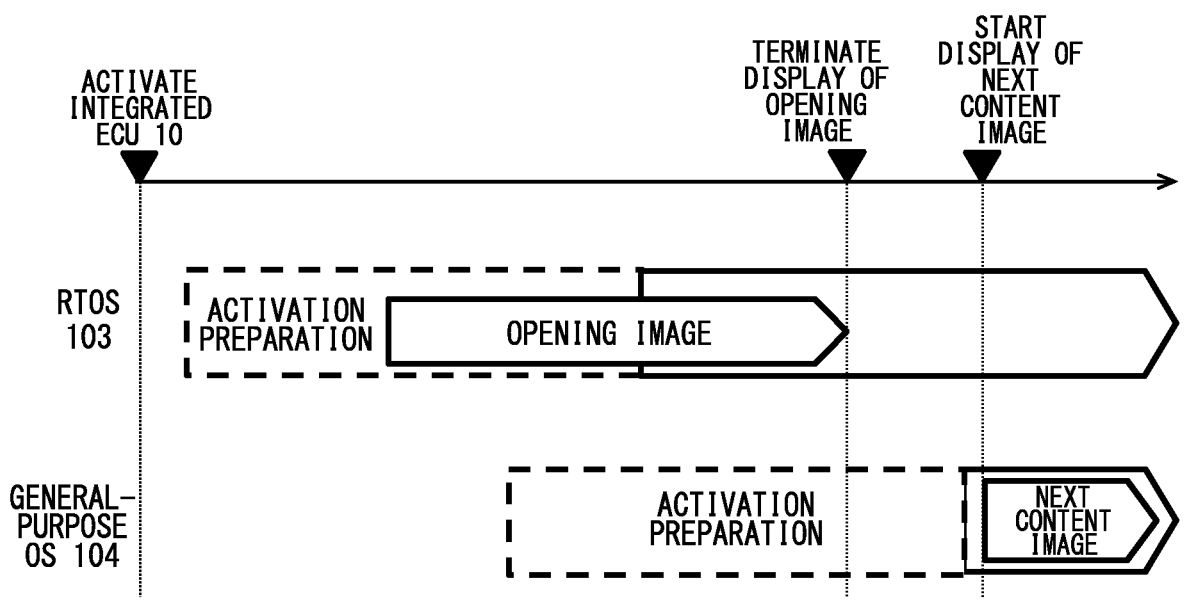
FIG. 5 is a diagram for illustrating a problem with the configuration according to the first embodiment.

Now, the problem with the configuration according to the first embodiment is described with reference to FIG. 5. While description is given herein taking an example of using the opening image as the precedent display image, the same applies to precedent display images other than the opening image. FIG. 5 is a time chart similar to that shown in FIG. 4. As shown in FIG. 5, according to the configuration of the first embodiment, the RTOS 103 that generates the opening image is activated more promptly than the general-purpose OS 104 that generates the next content image. In this case, as shown in FIG. 5, free time from an end of display of the opening image to the start of display of the next content image increases. When the free time increases, images sequentially displayed on the CID 20 appear intermittent to the user, which may give the user an uncomfortable feeling. On the other hand, when the opening image remains displayed until the start of display of the next content image even after the end of display of the opening image, the opening image appears frozen to the user, which may give the user the uncomfortable feeling.

As a configuration that solves the above problem, a configuration of a second embodiment is described below with reference to drawings. The vehicle display system 1 according to the second embodiment is similar to the vehicle display system 1 according to the first embodiment except that a part of the process at the RTOS 103 and the first image output unit 120 is different. In the following, the difference from the first embodiment is described among the process at the RTOS 103 and the first image output unit 120.

The RTOS 103 generates a partial image consisting of a part of the display element (hereinbelow, partial display element) of the next content image after the end of generation of the opening image and before starting the display of the next content image. The end of generation of the opening image as used herein means the end of generation of all the images to be displayed as the opening image. When the opening image is displayed by animation, it means the end of generation of all the frames of still images constituting the animation.

The partial display element is preferably a display element that does not include a display element (hereinbelow, operation reception related element) for the application run by the general-purpose OS 104 to receive an operation from the user. The operation reception related element may include, for example, a display element that forms a button display that receives an operation from the user, a display element that forms a related sentence such as a note that triggers the user to perform an operation, and the like. The display element configuring the button display may include a button shape, a character, and/or a picture. The partial display element may include, for example, a frame in which the operation reception related element is arranged. In the following, description is given assuming that the next content image consists of the button display and the note that are the operation reception related elements and the frame that is the partial display element.

The first image output unit 120 displays the partial image consisting of the frame generated by the RTOS 103 on the CID 20 after the end of display of the opening image until the start of display of the next content image. The first image output unit 120 then switches to display the next content image in a case in which the general-purpose OS 104 has been activated and the next content image is generated. Switching to display the next content image may be achieved by, for example, the RTOS 103 switching an image to be developed in the graphic memory. In this case, the RTOS 103 may be configured to receive a notice indicative that the general-purpose OS 104 has generated the next content image from the general-purpose OS 104 via the service bus and to switch the image to be developed in the graphic memory.

Figure 6:
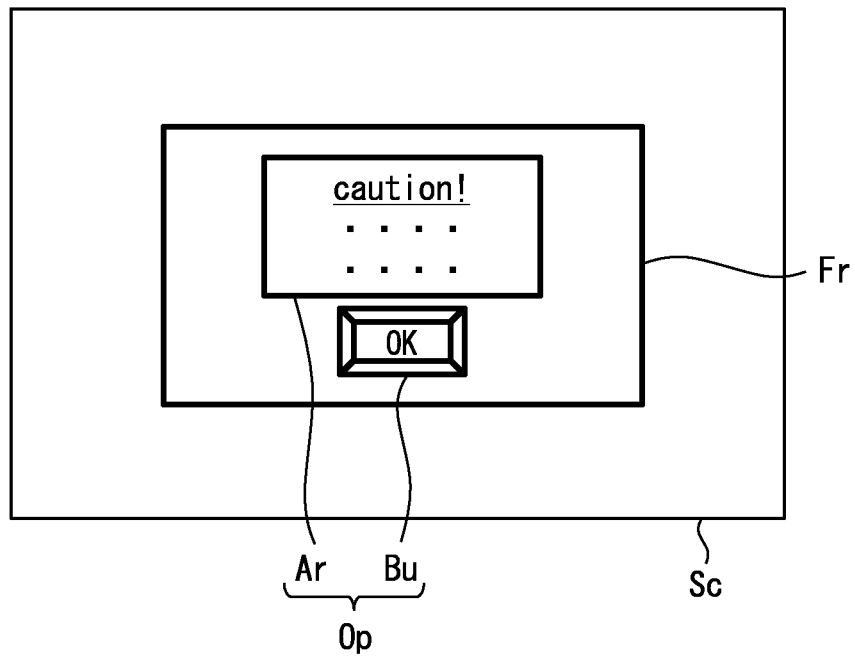
FIG. 6 is a diagram for illustrating an example of a next content image.
Figure 7:
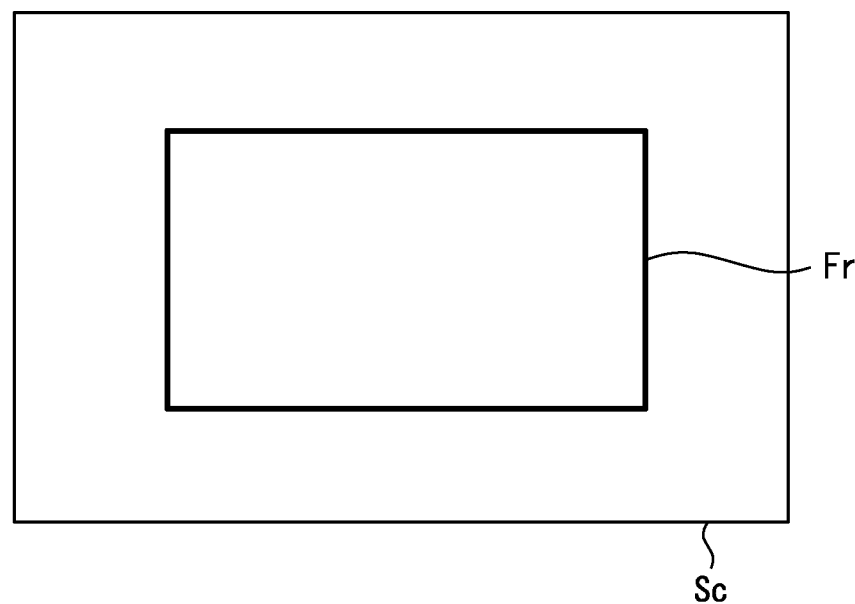
FIG. 7 is a diagram for illustrating an example of a partial image.

According to the configuration of the second embodiment, such a partial image as shown in FIG. 7 is displayed after displaying the opening image until the next content image shown in FIG. 6 is displayed. Sc in FIGS. 6 and 7 denotes a screen of the CID 20 and Fr denotes the frame as the partial image. Op in FIG. 6 denotes the operation reception related element. Bu in FIG. 6 denotes the display element constituting the button display among the operation reception related elements and Ar denotes the display element constituting the related sentence among the operation reception related elements.

According to this, the partial image is displayed during the free time during which it is not possible to display the next content image (i.e., after displaying the opening image until the next content image is displayed). By displaying the partial image during the free time, the images can be sequentially displayed on the CID 20, which would it make difficult for the user to see the images interruptedly. Moreover, because the partial image is an image excluding the operation reception related element from the next content image, it is made possible to show as if the image is gradually shifting to the next content image by displaying the partial image. Therefore, the user hardly receives an uncomfortable feeling.

Moreover, the operation reception related element is not displayed before completion of activating the general-purpose OS 104 since the partial image to be displayed before displaying the next content image does not include the operation reception related element. That is, in a case in which the general-purpose OS 104 has not completed its activation and the application to be run by the general-purpose OS 104 cannot receive an operation from the user, the operation reception related element is not shown. Accordingly, it is possible to avoid such a situation in which the user performs an unnecessary operation. After the general-purpose OS 104 has been activated, for example, the configuration may allow the application to be run by the general-purpose OS 104 to receive the operation from the user on the button display, for example, and to proceed to the next process.

The partial image to be displayed before displaying the next content image may be configured to include the operation reception related element, if it is a part of the next content image. Even in this case, the images sequentially displayed on the CID 20 are interrupted and become difficult for the user to see by the partial image being displayed during the free time when it is not possible to display the next content image. Moreover, it is made possible to show as if the image is gradually shifting to the next content image. Therefore, the user hardly receives an uncomfortable feeling.

Figure 8:
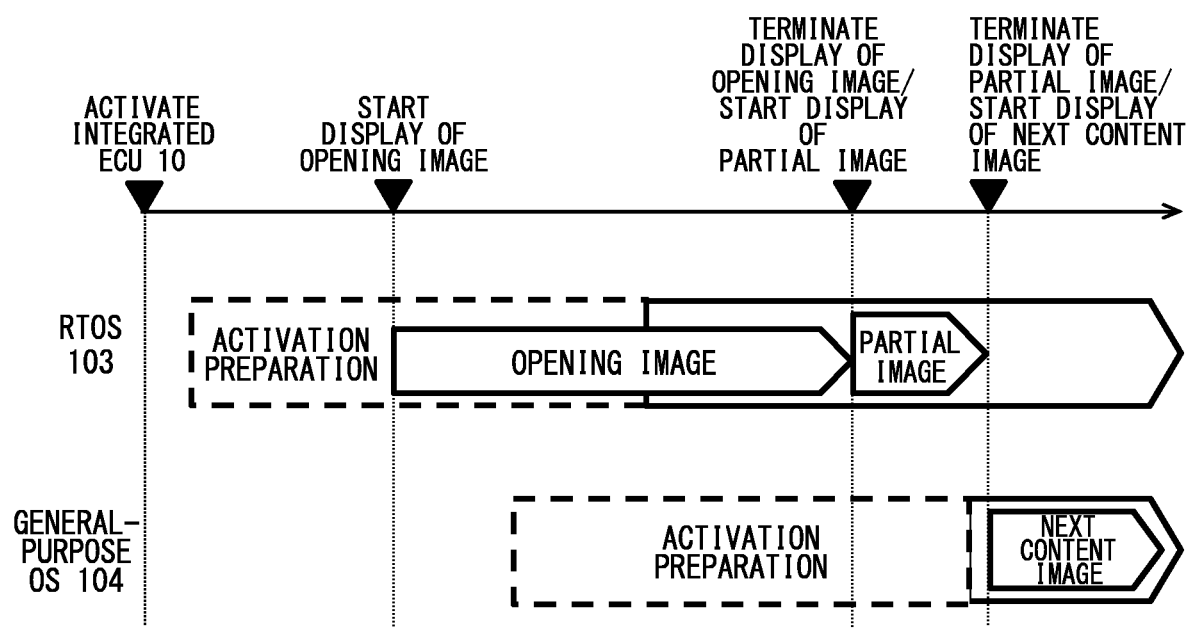
FIG. 8 is a diagram for illustrating an example of a more preferred configuration according to a second embodiment.

As shown in FIG. 8, it is more preferable that the first image output unit 120 keeps displaying the partial image consisting of the frame generated by the RTOS 103 on the CID 20 after the end of display of the opening image until the start of display of the next content image. According to this, there is no free time after displaying the opening image until the next content image is displayed and the images sequentially displayed on the CID 20 are further interrupted and become more difficult for the user to see. Therefore, the user hardly receives an uncomfortable feeling.

Figure 9:
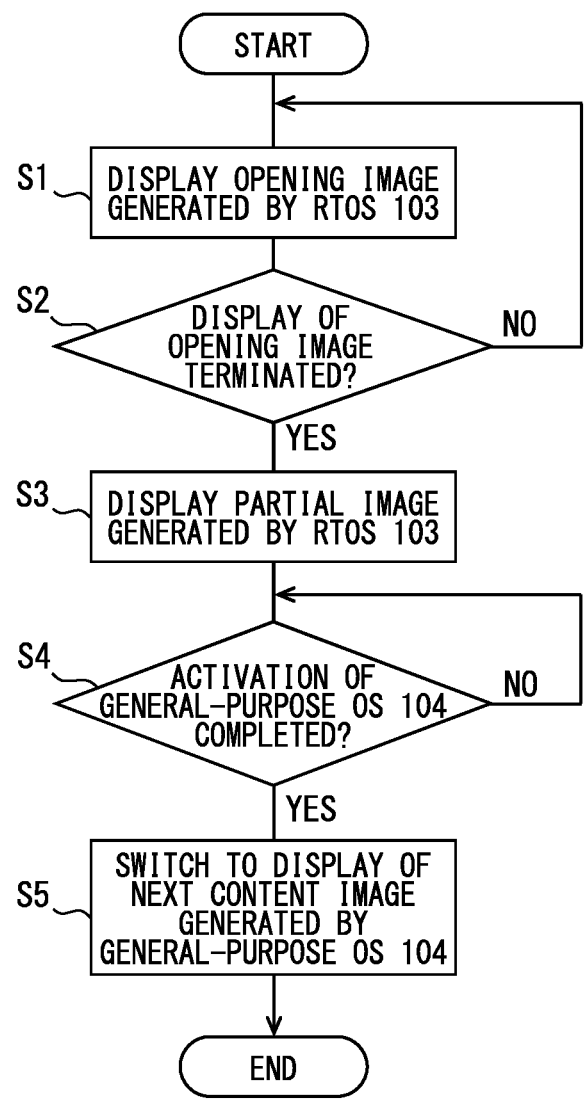
FIG. 9 is a flowchart showing an example of a flow of a process related to activation time display at the integrated ECU according to the second embodiment.

Now, an example of a flow of a process related to image display at the integrated ECU 10 according to the second embodiment until the next content image is displayed at the time of activating the integrated ECU 10 (hereinbelow, process related to activation time display) is described with reference to a flowchart shown in FIG. 9. The flowchart in FIG. 9 may be configured to start when the activation of the integrated ECU 10 starts.

First, at Step S1, the RTOS 103 starts the activation preparation earlier than the general-purpose OS 104 and the RTOS 103 generates an opening image. The first image output unit 120 then starts to display the opening image on the CID 20. At Step S2, the process proceeds to Step S3 if the display of the opening image is terminated (YES at S1). On the other hand, if the display of the opening image is not terminated (NO at S1), the process returns to S1 and repeats the process.

At Step S3, the RTOS 103 generates a partial image. The first image output unit 120 then starts to display the partial image on the CID 20. At Step S4, the process proceeds to Step S5 if the general-purpose OS 104 has completed its activation (YES at S4). On the other hand, if the general-purpose OS 104 has not completed activation (NO at S4), the process repeats Step S4.

At Step S5, the general-purpose OS 104 generates a next content image. The first image output unit 120 then switches to display the partial image, starts displaying the next content image on the CID 20, and terminates the process related to activation time display.

The configuration according to the second embodiment is similar to the configuration according to the first embodiment except that the partial image is displayed after the precedent display image is displayed until the next content image is displayed. Accordingly, as with the configuration according to the first embodiment, even when using the technology of enabling a plurality of OSs to run in parallel in a vehicle control device that makes a display in a vehicle cabin perform display, it is possible to display the display content to be displayed promptly at the time of activating the vehicle control device more promptly than other display contents. The configuration according to the second embodiment hardly provides the user with an uncomfortable feeling by the images sequentially displayed on the display at the time of activating the vehicle control device as described above, while providing the above-mentioned effect.

Moreover, the configuration according to the second embodiment allows for switching the display of the partial image generated by the RTOS 103 to the display of the next content image generated by the general-purpose OS 104. Although the next content image can be displayed by combining the partial image generated by the RTOS 103 with the image excluding the partial image from the next content image, the configuration according to the second embodiment allows for displaying the next content image by replacement instead of combination. Accordingly, it is possible to display each display element in the next content image without misalignment without increasing processing load of the integrated ECU 10 even when the next content image is complex.

Third Embodiment

Although the second embodiment presented the configuration that switches the display of the partial image generated by the RTOS 103 to the display of the next content image generated by the general-purpose OS 104 in a case in which the general-purpose OS 104 has completed its activation, the invention is not necessarily limited thereto. For example, the configuration may allow for continuing to display the partial image generated by the RTOS 103 even after the general-purpose OS 104 has completed its activation, combining the partial image with the image generated by the general-purpose OS 104, and displaying the resulting next content image (hereinbelow, third embodiment). The vehicle display system 1 according to the third embodiment is similar to the vehicle display system according to the second embodiment except that a part of the process at the RTOS 103 and the general-purpose OS 104 is different.

The RTOS 103 is similar to the second embodiment in that it generates the partial image consisting of the partial display element after completion of generation of the opening image. Upon completion of activation, the general-purpose OS 104 generates a residual image that is the display element excluding the partial display element from among the next content image to be displayed after the opening image (hereinbelow, residual display element). The general-purpose OS 104 according to the third embodiment is different from the second embodiment in generating the residual display element included in the next content image (i.e., not generating the next content image itself). The residual display element is preferably the operation reception related element described in the second embodiment. The residual display element is equivalent to a second side element.

The first image output unit 120 keeps displaying the partial image consisting of a frame generated by the RTOS 103 on the CID 20 after the end of display of the opening image. Then, when the general-purpose OS 104 is activated and generates the residual image, the first image output unit 120 displays the next content image by combining the partial image with a residual image. That is, the next content image is displayed by displaying the residual display element along with the partial display element.

By way of example, the process of the RTOS 103 herein is described. When display of the opening image is terminated, the RTOS 103 generates the partial image and writes the partial image to the shared memory. The RTOS 103 then develops the partial image written into the shared memory in the graphic memory. This makes the first image output unit 120 display the partial image. Subsequently, when the general-purpose OS 104 is activated, the general-purpose OS 104 generates the residual image and writes the residual image into the shared memory. Upon receiving a notice indicating that the general-purpose OS 104 generated the residual image from the general-purpose OS 104 via the service bus, the RTOS 103 synthesizes the next content image from layers of the partial image and the residual image written into the shared memory and develops the next content image in the graphic memory. This allows the first image output unit 120 to display the next content image.

Since the configuration according to the third embodiment is similar to the configuration of the second embodiment in that the partial image is displayed after displaying the opening image until displaying the next content image, the configuration hardly provides the user with an uncomfortable feeling by the images sequentially displayed on the display at the time of activating the vehicle control device. Accordingly, even when using the technology of enabling a plurality of OSs to run in parallel in a vehicle control device that makes a display in a vehicle cabin perform display, the configuration hardly provides the user with an uncomfortable feeling by the images sequentially displayed on the display at the time of activating the vehicle control device while making it possible to display the display content to be displayed promptly at the time of activating the vehicle control device more promptly than other display contents.

Figure 10:
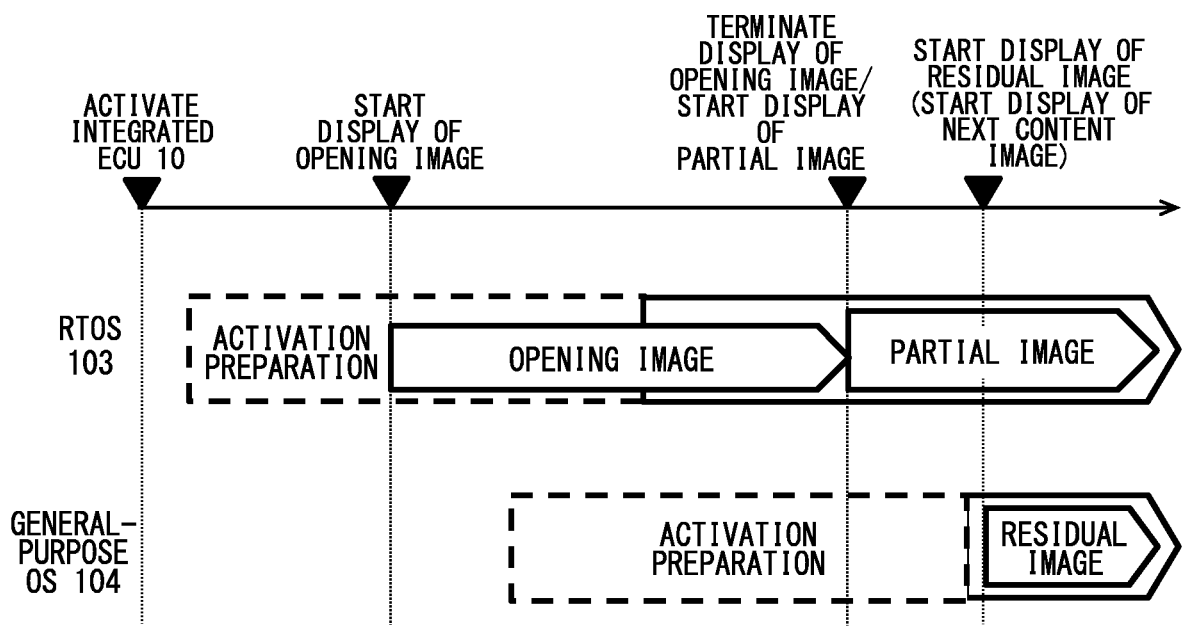
FIG. 10 is a diagram for illustrating an example of a more preferred configuration according to a third embodiment.

As shown in FIG. 10, the first image output unit 120 preferably keeps displaying the partial image consisting of the frame generated by the RTOS 103 on the CID 20 after the end of display of the opening image. According to this, there is no free time after displaying the opening image until displaying the next content image and the images sequentially displayed on the CID 20 are further interrupted and become more difficult for the user to see. Therefore, the user hardly receives an uncomfortable feeling.

Fourth Embodiment

Although the aforementioned embodiments presented the configuration in which the hypervisor 102 that is the virtualization software and the RTOS 103 that operates on the hypervisor 102 use the common kernel, the invention is not limited thereto. For example, the OS used by the virtualization software may be configured to use a kernel not common to any of the OSs running on the virtualization software (hereinbelow, fourth embodiment). The vehicle display system 1 according to the fourth embodiment is similar to the vehicle display system 1 according to the first embodiment except that a part of the conceptual configuration of the physical processor 101 is different.

Conceptual Configuration of Physical Processor 101 in Main Microcontroller 100

Figure 11:
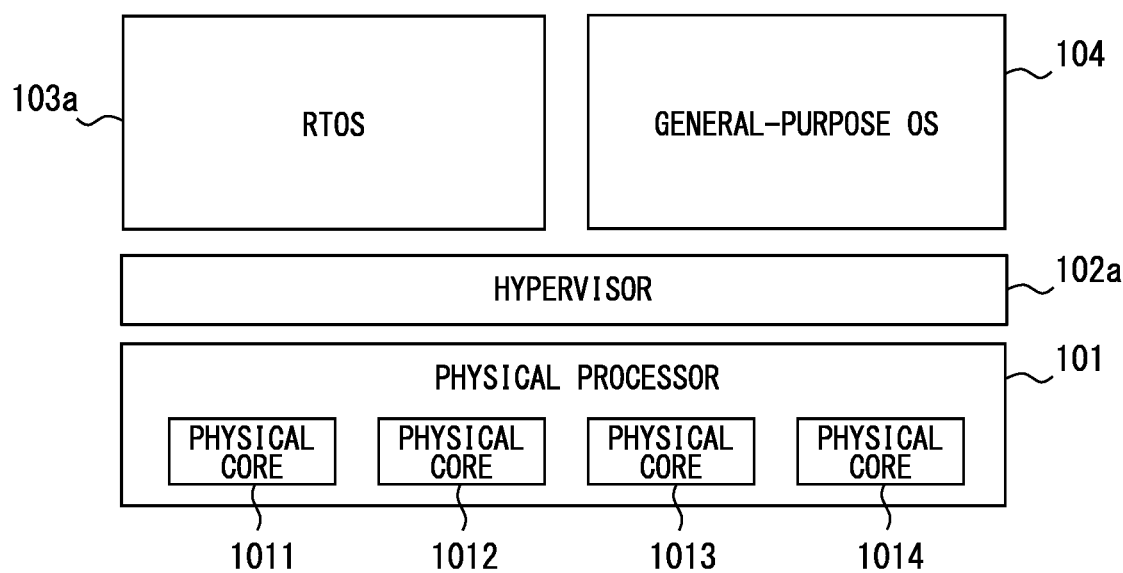
FIG. 11 shows an example of a conceptual configuration of the physical processor in the main microcontroller according to a fourth embodiment.

Now, an example of a conceptual configuration of the physical processor 101 according to the fourth embodiment is described with reference to FIG. 11. The description herein is given taking an example of using a hypervisor (Hypervisor) as the virtualization software and using an RTOS 103a and the general-purpose OS 104 as the two OSs. A hypervisor 102a does not share the kernel with any of the RTOS 103a and the general-purpose OS 104.

The RTOS 103a is similar to the RTOS 103 according to the first embodiment except that its kernel is not shared with the virtualization software that operates the RTOS 103a. The hypervisor 102a is similar to the hypervisor 102 according to the first embodiment except for temporarily concentrating the resource of the physical processor 101 on the RTOS 103a at the time of activating the integrated ECU 10.

The RTOS 103a may be, for example, QNX. The general-purpose OS 104 may be, for example Linux. The main microcontroller 100 includes the hypervisor 102a on the physical processor 101 consisting of four physical cores 1011, 1012, 1013, 1014. Although the physical processor 101 presents herein a configuration in which the physical processor 101 consists of four physical cores 1011 to 1014, there may be any number of physical cores other than four as long as there are more than one. The hypervisor 102a can run the RTOS 103a and the general-purpose OS 104 in parallel on the virtual core extracted from the physical processor 101. The hypervisor 102a and the RTOS 103a are not supposed to share the kernel as described above. The RTOS 103a is also equivalent to the first operating system.

Schematic Configuration of Hypervisor 102a

Figure 12:
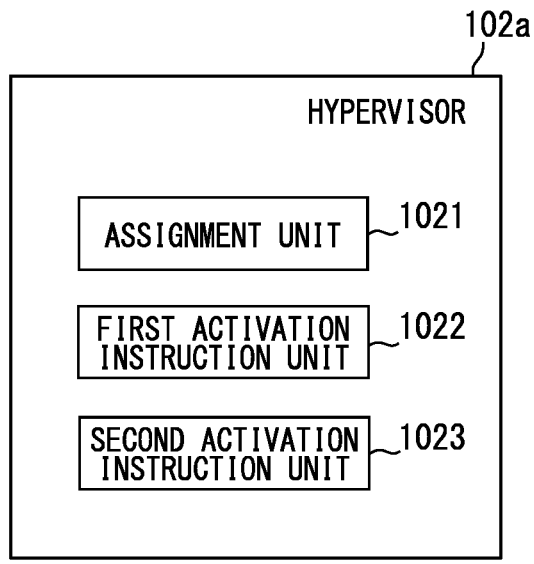
FIG. 12 shows an example of a schematic configuration of a hypervisor associated with temporary assignment.

In the main microcontroller 100, in a case of activating the RTOS 103a and the general-purpose OS 104, progress of the activation preparation of the RTOS 103a is accelerated by performing a temporary assignment that temporarily increases a quantity of the virtual cores (or the number of the virtual cores) that the hypervisor 102a assigns to the RTOS 103a. Now, the configuration of the hypervisor 102 is described in relation to the temporary assignment with reference to FIG. 12. As shown in FIG. 4, the hypervisor 102 includes an assignment unit 1021, a first activation instruction unit 1022, and a second activation instruction unit 1023 as functional blocks.

The assignment unit 1021 performs the temporary assignment of temporarily assigning more virtual cores to the RTOS 103a than an assigned quantity of the virtual cores preset as the assigned quantity after completing activation of the RTOS 103a. This makes it possible to reduce time taken to complete activation of the RTOS 103a as compared to a case in which the temporary assignment is not performed. It is thus possible to display the precedent display image displayed by the application run by the RTOS 103a more promptly. As a result, it is made possible to display the display content to be displayed promptly at the time of activating the integrated ECU 10 more promptly than other display contents. For example, the assignment unit 1021 may be configured to change assignment of the virtual cores to the OS by changing the linkage between the OS and the virtual core.

The assigned quantity after completing activation of the RTOS 103a and the general-purpose OS 104 (hereinbelow, operation-time assigned quantity) is preferably set fixedly so that one or more different physical cores 1011 to 1014 are assigned to the RTOS 103a and the general-purpose OS 104, respectively. In an example of the present embodiment, the virtual core to be assigned to the RTOS 103a may be preset fixedly to the virtual core that is linked to a logical core corresponding to the physical cores 1011, 1012 but not linked to a logical core corresponding to the physical cores 1013, 1014. On the other hand, the virtual core to be assigned to the general-purpose S 104 may be preset fixedly to the virtual core that is linked to the logical core corresponding to the physical cores 1013, 1014 but not linked to the logical core corresponding to the physical cores 1011, 1012.

In a case in which a specific physical core is not assigned with respect to each of the RTOS 103a and the general-purpose OS 104 during operation of the RTOS 103a and the general-purpose OS 104, the physical core which the frozen OS was accessing may not be open and reliability may be reduced by another OS which shares the physical core being unable to operate. In this regard, the configuration described above makes it possible to improve the reliability of the RTOS 103a and the general-purpose OS 104 by assigning the specific physical core with respect to each of the RTOS 103a and the general-purpose OS 104 during operation after completing activation of the RTOS 103a and the general-purpose OS 104. As a result, it is made possible to display the display content to be displayed promptly at the time of activating the integrated ECU 10 more promptly than other display contents.

Moreover, the operation-time assigned quantity is preferably preset fixedly so that one or more different physical cores 1011 to 1014 are assigned to the RTOS 103a and the general-purpose OS 104, respectively, and so that the physical cores sharing a cache are assigned to the same OS. This is because, in a case in which the physical cores sharing the cache are assigned to different OSs, the physical core which the frozen OS was accessing may not be open and another OS to which the physical core sharing the cache with the physical core is assigned may not be able to operate.

For example, in an example of the present embodiment, in a case in which the physical core 1011 and the physical core 1002 share the cache and the physical core 1013 and the physical core 1014 share the cache, the following may suffice. It suffices that the virtual core linked to the logical core corresponding to the physical core 1011 and the virtual core linked to the logical core corresponding to the physical core 1012 are not assigned to different OSs. Moreover, it suffices that the virtual core linked to the logical core corresponding to the physical core 1013 and the virtual core linked to the logical core corresponding to the physical core 1014 are not assigned to different OSs.

According to this, it is made possible to further improve the reliability of the RTOS 103a and the general-purpose OS 104. As a result, it is made possible to display the display content to be displayed promptly at the time of activating the vehicle control device more promptly than other display contents while further improving the reliability of the RTOS 103a and the general-purpose OS 104.

Figure 13:
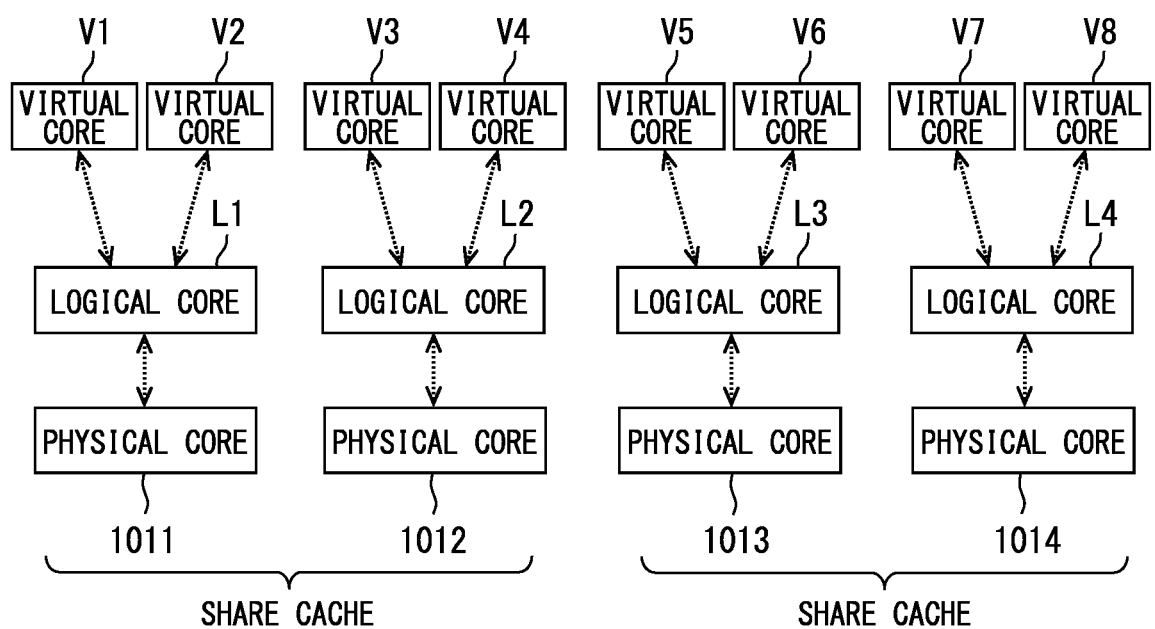
FIG. 13 is a schematic diagram for illustrating an example of an operation-time assigned quantity.

Now, an example of the operation-time assigned quantity is described with reference to FIG. 13. FIG. 13 takes an example in which one of the logical cores L1 to L4 corresponds to respective one of the physical cores 1011 to 1014. FIG. 13 takes an example in which two of the virtual cores V1 to V8 correspond to respective one of the logical cores L1 to L4. The logical core L1 corresponds to the physical core 1011 and the virtual cores V1, V2 are linked to the logical core L1. The logical core L2 corresponds to the physical core 1012 and the logical cores L3, L4 are linked to the logical core L2. The logical core L3 corresponds to the physical core 1013 and the virtual cores V5, V6 are linked to the logical core L3. The logical core L4 corresponds to the physical core 1014 and the virtual cores V7, V8 are linked to the logical core L4. In FIG. 13, it is assumed that the cache is shared between the physical core 1011 and the physical core 1012 and between the physical core 1013 and the physical core 1014.

In the example shown in FIG. 13, such an assignment by which the virtual cores in a set such as a set of the virtual cores V1, V2, a set of the logical cores L3, L4, a set of the virtual cores V5, V6, and a set of the virtual cores V7, V8 are not assigned to different OSs is the assignment of the virtual core by which one or more of the different physical cores 1011 to 1014 are assigned to the RTOS 103a and the general-purpose OS 104, respectively. Moreover, in the example shown in FIG. 5, such an assignment by which the virtual cores in a set such as a set of the virtual cores V1 to V4 and a set of the virtual cores V5 to V8 are not assigned to different OSs is the assignment of the virtual core by which one or more of the different physical cores 1011 to 1014 are assigned to the RTOS 103a and the general-purpose OS 104, respectively, and by which the physical cores sharing the cache are assigned to the same OS.

The assignment unit 1021 preferably has a whole quantity of the virtual cores that can be assigned to the RTOS 103a and the general-purpose OS 104 assigned to the RTOS 103a at the time of the temporary assignment. Assigning the whole quantity of the virtual cores that can be assigned to the RTOS 103a and the general-purpose OS 104 as used herein does not mean assigning the whole quantity of the resource of the physical processor 101. This means assigning the resource of the physical processor 101 excluding a quantity required for components other than the RTOS 103a and the general-purpose OS 104, such as a quantity used for operating the hypervisor 102a. By way of example, the configuration may assign the virtual cores so as not to allow the general-purpose OS 104 to use any logical core while allowing the RTOS 103a to use all the logical cores. Even when the RTOS 103a is allowed to use all the logical cores, the usage rate of the resource of all the logical cores does not reach 100%.

According to this, it is made possible to spare the resource of the physical processor 101 available for an OS to be run on the hypervisor 102a for the activation preparation of the RTOS 103a. Accordingly, it is made possible to reduce the time taken for completing activation of the RTOS 103a. Therefore, it is made possible to more promptly display the precedent display image to be displayed by the application run on the RTOS 103a. As a result, it is made possible to more promptly display the display content to be displayed promptly at the time of activating the integrated ECU 10.

The assignment unit 1021 preferably starts the temporary assignment before the activation preparation of the general-purpose OS 104 is initiated. According to this, it is made possible to concentrate the resource of the physical processor 101 available for the OS run on the hypervisor 102 on the activation preparation of the RTOS 103a without waste. Accordingly, it is made possible to further reduce the time taken for completing activation of the RTOS 103a.

The assignment unit 1021 preferably terminates the temporary assignment no later than the completion of activation of the RTOS 103a. According to this, it is made possible to reduce the time taken to complete activation of the general-purpose OS 104 by terminating the temporary assignment and thereby increasing the resource of the physical processor 101 to be assigned to the general-purpose OS 104 after promptly displaying the display content to be promptly displayed at the time of activating the integrated ECU 10.

The assignment unit 1021 may, for example, terminate the temporary assignment when the aforementioned predetermined stage is reached. According to this, it is possible to reduce the time taken to complete activation of the general-purpose OS 104 by terminating the temporary assignment more promptly and thereby increasing the resource of the physical processor 101 to be assigned to the general-purpose OS 104 after completing preparation for the process that requires to promptly respond at the time of activating the vehicle such as meter drawing.

After completing activation of the RTOS 103a and the general-purpose OS 104, the assignment unit 1021 has preferably assigned aforementioned operation-time assigned quantity respectively preset fixedly to the RTOS 103a and the general-purpose OS 104, respectively, as the assigned quantity after completing activation of the RTOS 103a and the general-purpose OS 104. According to this, it is made possible to improve the reliability of the RTOS 103a and the general-purpose OS 104 by assigning the specific physical core with respect to each of the RTOS 103a and the general-purpose OS 104 during operation after completing activation of the RTOS 103a and the general-purpose OS 104.

After reaching the aforementioned predetermined stage, the assignment unit 1021 preferably assigns the aforementioned operation-time assigned quantity respectively preset fixedly as the assigned quantity after completing activation of the RTOS 103a and the general-purpose OS 104 to the RTOS 103a and the general-purpose OS 104, respectively. According to this, after reaching the predetermined stage performed by the RTOS 103a, it is made possible to improve the reliability after reaching the predetermined stage at the RTOS 103a by assigning the specific physical core with respect to each of the RTOS 103a and the general-purpose OS 104.

The first activation instruction unit 1022 starts the activation preparation of the RTOS 103a when configuration of the hypervisor 102a proceeds and it is made possible to start the activation preparation of the RTOS 103a.

On the basis of the fact that the configuration of the hypervisor 102a proceeds and it is possible to start the activation preparation of the general-purpose OS 104, the second activation instruction unit 1023 starts the activation preparation of the general-purpose OS 104. The second activation instruction unit 1023 preferably does not start the activation preparation of the general-purpose OS 104 until the activation preparation of the RTOS 103a reaches the aforementioned predetermined stage. According to this, until the activation preparation of the RTOS 103a reaches the predetermined stage, it is possible to concentrate the hardware resource of the physical processor 101 on the activation preparation of the RTOS 103a and it is possible to run the application more promptly that allows the RTOS 103a to display the precedent image.

Process Related to Temporary Assignment at Hypervisor 102a

Figure 14:
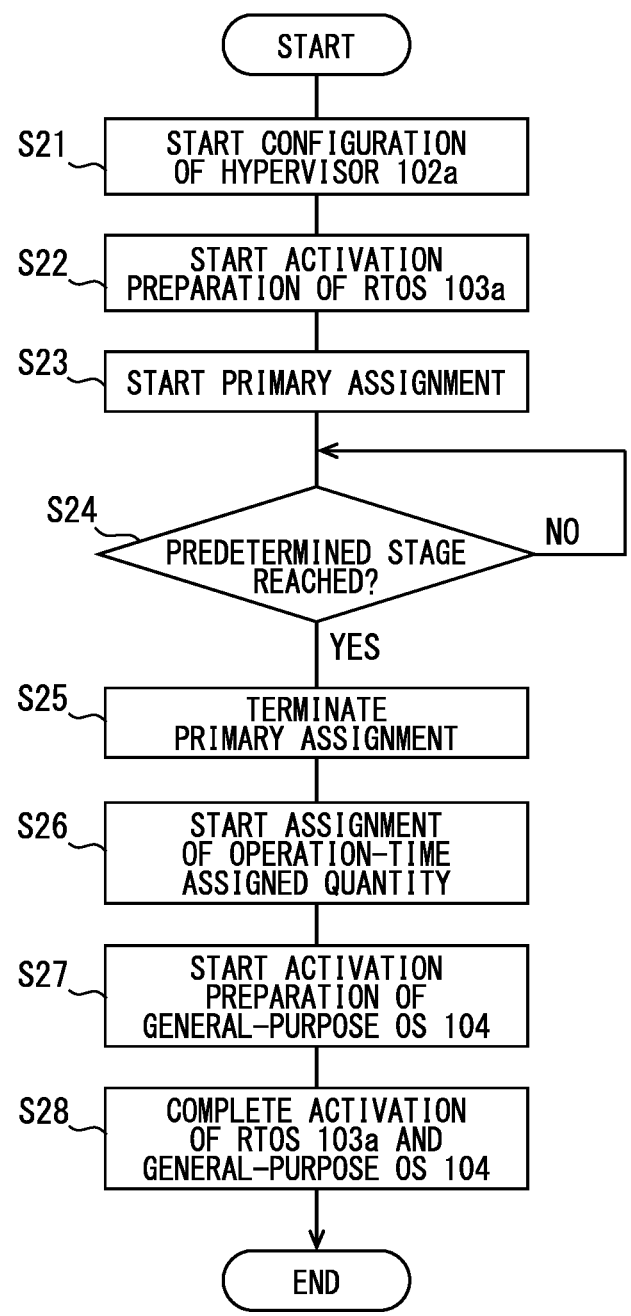
FIG. 14 is a flowchart showing an example of a flow of a process related to the temporary assignment at the hypervisor.

Now, an example of a flow of a process related to temporary assignment at the hypervisor 102a (hereinbelow, temporary assignment related process) is described with reference to a flowchart shown in FIG. 14. Moreover, a relation between an operating condition of the RTOS 103a and the general-purpose OS 104 and a variation in assignment of the virtual cores at the hypervisor 102a is also described with reference to a time chart shown in FIG. 15. The flowchart in FIG. 14 may be configured to start when the activation of the main microcontroller 100 starts.

First, at Step S21, the hypervisor 102 starts to be configured. At Step S22, if the configuration of the hypervisor 102 proceeds to a stage where the activation preparation of the RTOS 103a can start, the first activation instruction unit 1022 starts the activation preparation of the RTOS 103a. At Step S23, the assignment unit 1021 assigns the whole quantity of the virtual cores that can be assigned to the RTOS 103a and the general-purpose OS 104 to the RTOS 103a. In an example of the present embodiment, the temporary assignment is initiated that assigns the virtual cores so as not to allow the general-purpose OS 104 to use any logical core while allowing the RTOS 103a to use all of the four logical cores. That is, the virtual core is assigned to satisfy RTOS 103: general-purpose OS 104=4:0.

Figure 15:
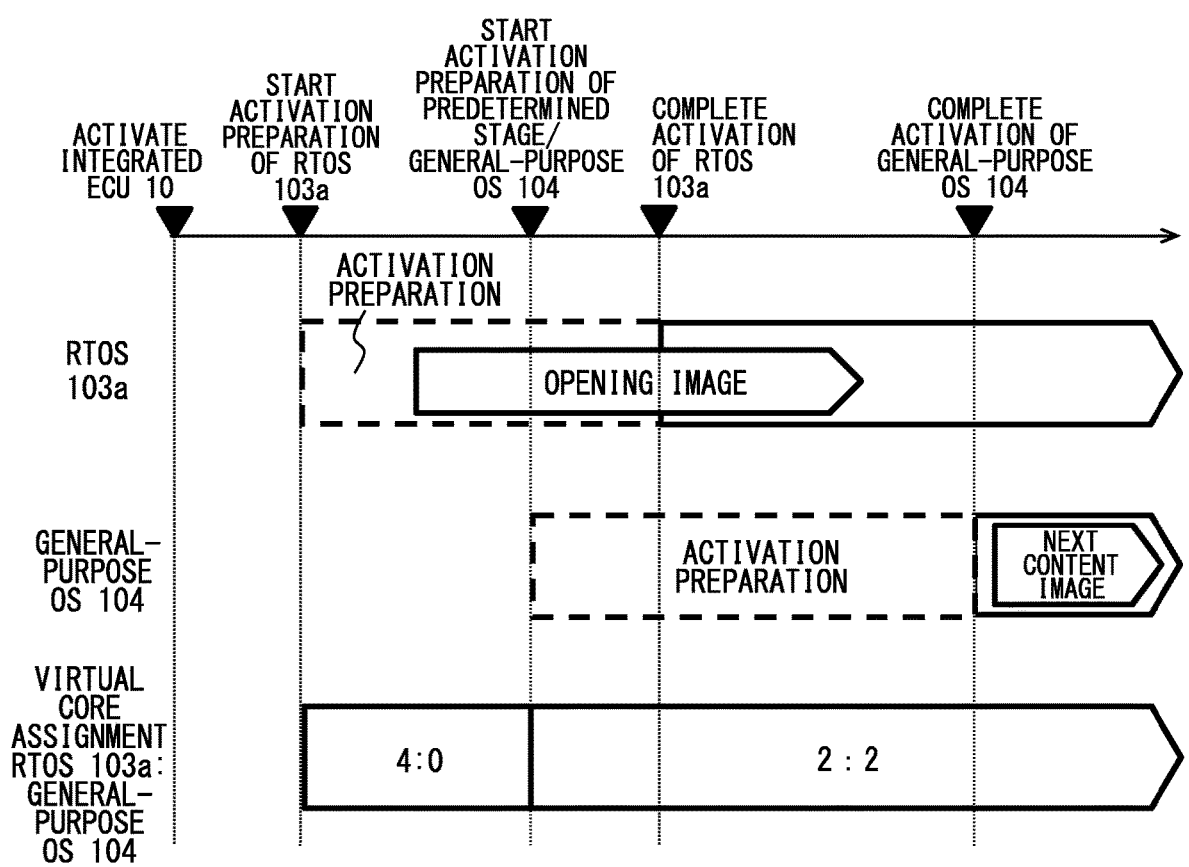
FIG. 15 is a time chart showing an example of relation between an operating condition of a RTOS and the general-purpose OS and variation of assignment of a virtual core in the hypervisor.

As shown in FIG. 15, the activation preparation of the RTOS 103a is initiated later than the start of configuration of the hypervisor 102a. In a case in which the activation preparation of the RTOS 103a is initiated, then the temporary assignment is initiated.

At Step S24, if an activation condition of the RTOS 103a reaches a predetermined stage (YES at S24), the process proceeds to Step S25. On the other hand, if the activation condition of the RTOS 103a does not reach the predetermined stage (NO at S24), the process repeats Step S24.

As shown in FIG. 15, the activation of the RTOS 103a reaches the predetermined stage after the activation preparation of the RTOS 103a is initiated and before the activation of the RTOS 103a is completed. In FIG. 15, description is given taking an example of a configuration that makes it possible to run a plurality of applications including the precedent display application at the time of activation completion.

At Step S25, the assignment unit 1021 terminates the temporary assignment. At Step S26, the assignment unit 1021 starts operation-time assignment that assigns the operation-time assigned quantity that is the assigned quantity of the virtual core after completing activation of the RTOS 103a and the general-purpose OS 104 to each of the RTOS 103*a* and the general-purpose OS 104. In an example of the present embodiment, the configuration assigns the virtual cores so as to allow the general-purpose OS 104 to use two logical cores not used by the RTOS 103*a* while allowing the RTOS 103*a* to use two other logical cores. That is, the virtual core is assigned to satisfy RTOS 103*a*: general-purpose OS 104=2:2.

At Step S27, the second activation instruction unit 1023 starts the activation preparation of the general-purpose OS 104. At Step S28, activation of both of the RTOS 103*a* and the general-purpose OS 104 is completed, and the temporary assignment related process is terminated.

As shown in FIG. 15, if the activation of the RTOS 103*a* reaches the predetermined stage, the activation preparation of the general-purpose OS 104 is initiated. Moreover, if the activation of the RTOS 103*a* reaches the predetermined stage, the temporary assignment is terminated and the operation-time assignment is initiated. For example, the activation preparation of the general-purpose OS 104 may be configured to start after the operation-time assignment is initiated. Moreover, in a case in which the activation of the priority application is completed and display of the priority image by the priority application is initiated first at the time of activating the integrated ECU 10, the temporary assignment may be terminated. For example, at the time of displaying the priority image, the temporary assignment may be terminated.

After completing activation of the RTOS 103*a*, activation of the general-purpose OS 104 is completed with delay. The general-purpose OS 104 having been activated may display the next content image that is an infotainment-based image. The operation-time assigned quantity should not be changed even after completing activation of both of the RTOS 103*a* and the general-purpose OS 104 after the operation-time assignment is performed after termination of the temporary assignment. The operation-time assigned quantity retains the assignment preset fixedly during operation of the RTOS 103*a* and the general-purpose OS 104. This improves the reliability of the RTOS 103*a* and the general-purpose OS 104 by continuing to assign the specific physical core with respect to each of the RTOS 103*a* and the general-purpose OS 104 during operation of the RTOS 103*a* and the general-purpose OS 104. In order to improve the reliability of the RTOS 103*a* and the general-purpose OS 104 during operation of the RTOS 103*a* and the general-purpose OS 104, it is not preferable to continue the temporary assignment until operation of both of the RTOS 103*a* and the general-purpose OS 104.

Summary of the Fourth Embodiment

According to the configuration of the fourth embodiment, the RTOS 103*a* starts to be activated earlier than the general-purpose OS 104 at the time of activating the integrated ECU 10 by performing the temporary assignment that temporarily increases the assigned quantity of the virtual core to the RTOS 103*a*. This allows the integrated ECU 10 to generate the image to be generated by the RTOS 103*a* at the time of activating the integrated ECU 10 earlier than the image to be generated by the general-purpose OS 104. Moreover, the first image output unit 120 is made to display the image generated by the RTOS 103*a* on the CID 20 earlier than the image generated by the general-purpose OS 104. Therefore, the integrated ECU 10 can display the precedent display image generated by the RTOS 103 at the time of activating the integrated ECU 10 more promptly than the next content image generated by the general-purpose OS 104.

As a result, even when using the technology of enabling a plurality of OSs to run in parallel in a vehicle control device that makes a display in a vehicle cabin perform display, it is possible to display the display content to be displayed promptly at the time of activating the vehicle control device more promptly than other display contents. The configuration of the fourth embodiment may be combined with the configuration of either the second embodiment or the third embodiment.

Fifth Embodiment

Although the aforementioned embodiments presented the examples of displaying the image on the CID 20, the invention is not necessarily limited thereto. For example, the meter MID 30 may be configured to display the image. In this case, the second image output unit 130 may be configured to read an image similar to the aforementioned precedent display image, the partial image, the next content image, or the like developed in the graphic memory as the image to be displayed on the meter MID 30 and output the image to the meter MID 30. In this case, the second image output unit 130 is also equivalent to the output unit.

Moreover, although the aforementioned embodiments presented the configurations in which the vehicle display system 1 includes two displays of the CID 20 and the meter MID 30, the invention is not necessarily limited thereto. For example, the vehicle display system 1 may be configured to include a display other than the CID 20 and the meter MID 30. For example, the vehicle display system 1 may be configured to include a head-up display instead of the meter MID 30. In this case, the other display than the CID 20 and the meter MID 30 may also be configured to display an image similar to the precedent display image, the partial image, the next content image, or the like.

Sixth Embodiment

Although the aforementioned embodiments presented the examples of running two OSs in parallel on the virtualization software, the invention is not necessarily limited thereto. There may be more than two OSs to be run in parallel.

Seventh Embodiment

Although the aforementioned embodiments presented the examples in which the physical processor runs the plurality of OSs in parallel by running the plurality of OSs in parallel on the virtualization software, the invention is not necessarily limited thereto. For example, in a case in which the physical processor consists of a plurality of physical processor cores, the physical processor may run the plurality of OSs in parallel by operating the plurality of OSs on different physical processor cores, respectively (hereinbelow, seventh embodiment).

In the case of the fifth embodiment, for example, the OS that generates the precedent display image may be activated earlier than other OSs at the time of activating the integrated ECU 10 to display the precedent display image promptly by increasing the number of the physical processor cores on which the OS that generates the precedent display image runs as compared to other OSs.

The present disclosure is not limited to the above-mentioned embodiments, but various alterations can be made within the scope of the claims, and embodiments resulting from combining technical means disclosed in different embodiments as desired fall within the technical scope of the present disclosure. Moreover, a control unit described in the present disclosure and a technique thereof may be achieved by a dedicated computer that configures a processor programmed to perform one or more functions embodied by a computer program. Alternatively, the device described in the present disclosure and the technique thereof may be achieved by a dedicated hardware logic circuit. Otherwise, the device described in the present disclosure and the technique thereof may be achieved by one or more dedicated computers configured by a combination of the processor that executes the computer program and one or more hardware logic circuits. Furthermore, the computer program may be stored in a computer-readable non-transitory tangible recording medium as an instruction executed by the computer.

The invention claimed is:

1. A vehicle control device that controls a display provided in a cabin of a vehicle, the device comprising:
   a physical processor that is configured to run a plurality of operating systems in parallel, each of the plurality of operating systems generating a display element to be displayed on the display; and
   an output unit that is configured to display the display element on the display by outputting the display element generated by each of the plurality of operating systems to the display, wherein
   the plurality of operating systems include:
      a first operating system that is configured to generate a precedent display element and to execute an application associated with a security/safety function; and
      one or more second operating systems that are the plurality of operating systems other than the first operating system and are configured to execute an application associated with an infotainment function that is a function associated with convenience and/or comfort other than security and safety,
   the precedent display element is the display element to be displayed foremost when activating the vehicle control device,
   the first operating system is configured to be activated prior to activating the one or more second operating systems when activating the vehicle control device,
   the one or more second operating systems are configured to generate a next content image that is a display content formed of the display element generated by the one or more second operating systems,
   the first operating system is configured to generate a partial image element that is a part of the next content image, and
   the output unit is configured to display the partial image element before display of the next content image starts after display of the precedent display element ended.

2. The vehicle control device according to claim 1, wherein
   the output unit is configured to keep displaying the partial image element generated by the first operating system until the display of the next content image starts after the display of the precedent display element ended.

3. The vehicle control device according to claim 1, wherein
   the one or more second operating systems are configured to execute an application related to a service provided to a user in the vehicle, and
   the precedent display element does not include a display element for the application to receive an operation from the user, and
   the next content image includes a display element for the application to receive an operation from the user.

4. The vehicle control device according to claim 1, wherein
   the physical processor is configured to run the plurality of operating systems in parallel on a virtualization software by a virtualization technology.

5. The vehicle control device according to claim 4, wherein
   at least one of the plurality of operating systems is configured to use a kernel common to the virtualization software, and
   the at least one of the plurality of operating systems includes the first operating system such that the first operating system is activated prior to activating the one or more second operating systems when activating the vehicle control device.

6. The vehicle control device according to claim 4, wherein
   the physical processor includes one or more processor cores,
   the one or more processor cores is abstracted into a plurality of virtual processor cores by the virtualization technology,
   the virtualization software is configured to assign the plurality of virtual processor cores to the first operating system and the one or more second operating systems, and
   a quantity of the plurality of virtual processor cores assigned to the first operating system is greater than a quantity of the plurality of virtual processor cores assigned to the one or more second operating systems such that the first operating system is activated prior to activating the one or more second operating systems when activating the vehicle control device.

7. The vehicle control device according to claim 4, wherein
   the one or more second operating systems are not activated until an activating status of the first operating system reaches a predetermined stage when activating the vehicle control device.

8. A vehicle display system, comprising:
   a display provided in a cabin of a vehicle; and
   the vehicle control device according to claim 1 that is configured to control the display.

9. A vehicle control device that controls a display provided in a cabin of a vehicle, the device comprising:
   a physical processor that is configured to run a plurality of operating systems in parallel, each of the plurality of operating systems generating a display element to be displayed on the display; and
   an output unit that is configured to display the display element on the display by outputting the display element generated by each of the plurality of operating systems to the display, wherein
   the plurality of operating systems include:
      a first operating system that is configured to generate a precedent display element and to execute an application associated with a security/safety function; and
      one or more second operating systems that are the plurality of operating systems other than the first operating system and are configured to execute an application associated with an infotainment function that is a function associated with convenience and/or comfort other than security and safety, the precedent display element is the display element to be displayed foremost when activating the vehicle control device, the first operating system is configured to be activated prior to activating the one or more second operating systems when activating the vehicle control device, the one or more second operating systems are configured to generate a next content image that is a content image containing a second side element generated by the one or more second operating systems as the display element, the first operating system is configured to generate a partial display element that is a part of the next content image excluding the second side element, and the output unit is configured to keep displaying the partial display element until display of the next content image starts after display of the precedent display element ended.

10. The vehicle control device according to claim 9, wherein
the output unit is configured to:
display the partial display element generated by the first operating system after the display of the precedent display element ended, and
when display of the second side element generated by the one or more second operating systems starts, display the next content image by displaying the partial display element together with the second side element.

11. A vehicle control device that controls a display provided in a cabin of a vehicle, the device comprising:
a physical processor that is configured to run a plurality of operating systems in parallel, each of the plurality of operating systems generating a display element to be displayed on the display; and
an output unit that is configured to display the display element on the display by outputting the display element generated by each of the plurality of operating systems to the display, wherein
the plurality of operating systems include:
a first operating system that is configured to generate a precedent display element; and
one or more second operating systems that are the plurality of operating systems other than the first operating system,
the precedent display element is the display element to be displayed foremost when activating the vehicle control device, and
the first operating system is configured to be activated prior to activating the one or more second operating systems when activating the vehicle control device, wherein
the one or more second operating systems are configured to generate a next content image that is a display content formed of the display element generated by the one or more second operating systems,
the first operating system is configured to generate a partial image element that is a part of the next content image, and
the output unit is configured to display the partial image element before display of the next content image starts after display of the precedent display element ended.

12. The vehicle control device according to claim 11, wherein
the output unit is configured to keep displaying the partial image element generated by the first operating system until the display of the next content image starts after the display of the precedent display element ended.

13. A vehicle control device that controls a display provided in a cabin of a vehicle, the device comprising:
a physical processor that is configured to run a plurality of operating systems in parallel, each of the plurality of operating systems generating a display element to be displayed on the display; and
an output unit that is configured to display the display element on the display by outputting the display element generated by each of the plurality of operating systems to the display, wherein
the plurality of operating systems include:
a first operating system that is configured to generate a precedent display element; and
one or more second operating systems that are the plurality of operating systems other than the first operating system,
the precedent display element is the display element to be displayed foremost when activating the vehicle control device, and
the first operating system is configured to be activated prior to activating the one or more second operating systems when activating the vehicle control device, wherein
the one or more second operating systems are configured to generate a next content image that is a content image containing a second side element generated by the one or more second operating systems as the display element,
the first operating system is configured to generate a partial display element that is a part of the next content image excluding the second side element, and
the output unit is configured to keep displaying the partial display element until display of the next content image starts after display of the precedent display element ended.

14. The vehicle control device according to claim 13, wherein
the output unit is configured to:
display the partial display element generated by the first operating system after the display of the precedent display element ended, and
when display of the second side element generated by the one or more second operating systems starts, display the next content image by displaying the partial display element together with the second side element.

15. A vehicle display control method for a vehicle control device to control a display provided in a cabin of a vehicle, the method comprising:
when activating the vehicle control device,
activating a first operating system first among a plurality of operating systems, and then
activating one or more second operating systems that are the plurality of operating systems other than the first operating system, wherein
the plurality of operating systems are configured to generate a display element to be displayed on the display and are controlled to operate in parallel by a physical processor,
the first operating system is configured to generate a precedent display element that is the display element to be displayed foremost and to execute an application associated with a security/safety function, the one or more second operating systems are configured to execute an application associated with an infotainment function that is a function associated with convenience and/or comfort other than security and safety, the one or more second operating systems are configured to generate a next content image that is a display content formed of the display element generated by the one or more second operating systems, the first operating system is configured to generate a partial image element that is a part of the next content image, and the method further comprises displaying the partial image element before display of the next content image starts after display of the precedent display element ended.

16. A vehicle display control method for a vehicle control device to control a display provided in a cabin of a vehicle, the method comprising:

when activating the vehicle control device,
activating a first operating system first among a plurality of operating systems, and then
activating one or more second operating systems that are the plurality of operating systems other than the first operating system, wherein the plurality of operating systems are configured to generate a display element to be displayed on the display and are controlled to operate in parallel by a physical processor, and the first operating system is configured to generate a precedent display element that is the display element to be displayed foremost, wherein the one or more second operating systems are configured to generate a next content image that is a display content formed of the display element generated by the one or more second operating systems, the first operating system is configured to generate a partial image element that is a part of the next content image, and the method further comprises displaying the partial image element before starting display of the next content image after ending display of the precedent display element.

17. A vehicle display control method for a vehicle control device to control a display provided in a cabin of a vehicle, the method comprising:

when activating the vehicle control device,
activating a first operating system first among a plurality of operating systems, and then
activating one or more second operating systems that are the plurality of operating systems other than the first operating system, wherein the plurality of operating systems are configured to generate a display element to be displayed on the display and are controlled to operate in parallel by a physical processor, and the first operating system is configured to generate a precedent display element that is the display element to be displayed foremost, wherein the one or more second operating systems are configured to generate a next content image that is a content image containing a second side element generated by the one or more second operating systems as the display element, the first operating system is configured to generate a partial display element that is a part of the next content image excluding the second side element, and the method further comprises keeping displaying the partial display element until display of the next content image starts after ending display of the precedent display element.

18. A vehicle display control method for a vehicle control device to control a display provided in a cabin of a vehicle, the method comprising:

when activating the vehicle control device,
activating a first operating system first among a plurality of operating systems, and then
activating one or more second operating systems that are the plurality of operating systems other than the first operating system, wherein the plurality of operating systems are configured to generate a display element to be displayed on the display and are controlled to operate in parallel by a physical processor, the first operating system is configured to generate a precedent display element that is the display element to be displayed foremost and to execute an application associated with a security/safety function, the one or more second operating systems are configured to execute an application associated with an infotainment function that is a function associated with convenience and/or comfort other than security and safety, the one or more second operating systems are configured to generate a next content image that is a content image containing a second side element generated by the one or more second operating systems as the display element, the first operating system is configured to generate a partial display element that is a part of the next content image excluding the second side element, and the method further comprises keeping displaying the partial display element until display of the next content image starts after display of the precedent display element ended.

* * * * *